United States Patent [19]

Noda et al.

[11] Patent Number: 5,603,851
[45] Date of Patent: Feb. 18, 1997

[54] WIRE CUTTING ELECTRICAL DISCHARGE MACHINE WITH WIRE ANNEALING FOR THREADING

[75] Inventors: Masanori Noda, Fukuma-machi; Tatsuji Komatsu, Koga-machi; Takashi Mitsuyasu, Munakata, all of Japan

[73] Assignee: Seibu Electric & Machinery Co., Ltd., Fukuoka-ken, Japan

[21] Appl. No.: 636,474

[22] Filed: Apr. 23, 1996

[30] Foreign Application Priority Data

Aug. 14, 1995  [JP]  Japan .................... 7-226980

[51] Int. Cl.$^6$ .................. B23H 1/00; B23H 7/10
[52] U.S. Cl. ......................................... 219/69.12
[58] Field of Search ........................... 219/69.12

[56] References Cited

U.S. PATENT DOCUMENTS

| | | | |
|---|---|---|---|
| 4,778,972 | 10/1988 | Josserand | 219/69.12 |
| 4,783,583 | 11/1988 | Obara et al. | 219/69.12 |
| 5,077,457 | 12/1991 | Onaka et al. | 219/69.12 |
| 5,130,508 | 7/1992 | Umetsu et al. | 219/69.12 |
| 5,340,958 | 8/1994 | Okazaki et al. | 219/69.12 |

FOREIGN PATENT DOCUMENTS

| | | |
|---|---|---|
| 2-145215 | 6/1990 | Japan . |
| 6-15125 | 3/1994 | Japan . |
| 6-75808 | 9/1994 | Japan . |

Primary Examiner—Geoffrey S. Evans
Attorney, Agent, or Firm—Browdy and Neimark

[57]  ABSTRACT

A wire electrical discharge machine that reliably feeds the wire electrode at high speed into an upper wire head, holes in the work and a lower wire head. This wire electrical discharge machine moves the holder, which has a vertically extending feed pipe secured thereto, up or down at high speed by activating the cylinder device. At the same time, the lower end of the wire electrode is clamped by the clamping members and the anneal rollers are driven in the reverse direction to tense the wire electrode. With the wire electrode tensed in this way, the anneal processing is performed. This construction makes the machine compact. Further, when the wire electrode is to be inserted into the holes in the work, it is fed at low speed by the anneal rollers. When the wire electrode rides on the jet stream in the jet stream guide pipe, the wire electrode is moved at high speed by the anneal rollers to reduce the time taken by the wire electrode feeding.

10 Claims, 6 Drawing Sheets

WIRE CUTTING ELECTRICAL DISCHARGE MACHINE WITH WIRE ANNEALING FOR THREADING

BACKGROUND OF THE INVENTION

1. Field of the Invention

The present invention relates to a wire electrical discharge machine with an automatic wire feeder that performs electric discharge machining on a work.

2. Description of the Prior Art

Conventional wire electrical discharge machines are known to have a construction shown in FIG. 6. This type of wire electrical discharge machine uses a feed pipe 5 vertically movable along a head 10 to guide and insert a wire electrode 1 supplied by the wire electrode feeder into a start hole and machining path holes 26 in a work 8 secured by a clamp 22 on a support base 21. The head 10 is mounted with guide rods 24 each formed with a feed screw 35. A holder 20 has the feed pipe 5 secured thereto so that the feed pipe 5 extends vertically downward. The holder 20 is driven vertically along the guide rods 24 of the head 10 by rotating the feed screws by a motor (not shown). The wire electrode 1 that was used for electrical discharge machining of the work 8 is pulled out by pullout rollers 12 installed downstream of a lower wire head 7. The feeding of the wire electrode 1 is detected by a wire break sensor 62 and is performed by a pair of anneal rollers 13 provided to the holder 20 that vertically reciprocates along the head 10 or by a pair of common rollers 14 provided downstream of a cutter 16, which is installed in a lower part of the head 10 to cut the wire electrode 1. The cutter 16 cuts the wire electrode 1 to trim the front end of the wire electrode 1 so that it can be passed through an upper wire head 6, a hole 26 of the work 8 and a lower wire head 7. The wire electrical discharge machine of this kind is disclosed in, for example, Japan Patent Laid-Open No. 145215/1990.

The above-mentioned wire electrode feeder is disclosed in Japan Patent Publication No. 15125/1994. The wire electrode feeder includes a pair of guide rollers arranged below the lower wire head to clamp and guide the wire electrode, pullout rollers located by the side of the guide rollers to draw out the wire electrode, and a belt wound on the guide rollers and the pullout rollers. The wire electrode, worn after being used for electrical discharge-machining of the work, is drawn out through the lower wire head, wound around the guide rollers, clamped and moved by the belt, and then pulled out by the pullout rollers for recovery.

Another type of wire electrode feeder is disclosed in Japan Patent Publication No. 75808/1994. The wire electrode feeder incorporates a direction change roller disposed below the lower wire head. This feeder also includes a guide pipe to feed out the wire electrode, after having its direction changed by the direction change roller, by water flow, and pullout rollers to clamp and pull out the wire electrode discharged from the guide pipe.

With the conventional wire electrical discharge machine, however, when the wire electrode situated between the anneal rollers and the common rollers is clamped by the anneal rollers and subjected to annealing, the wire electrode is formed with an impression at the clamped portion. When the wire electrode with an impression is automatically supplied and passed into a hole in the work, it needs to be moved down through the hole at a very slow speed, making it impossible to shorten the wire electrode feeding time. That is, the annealing of the wire electrode involves holding the wire electrode by the anneal rollers and driving the common rollers located below the anneal rollers in forward direction to tense the wire electrode. The wire electrode is therefore formed with a large impression where the anneal rollers clamp it. Because the impression is located downstream of the annealed portion of the wire electrode, it becomes a hindrance to the passage through the upper wire head, lower wire head and the hole in the work, preventing smooth feeding of the wire electrode.

As the wire electrical discharge machine becomes large, the distance from the wire electrode direction change roller in the wire electrode recovery device located below the lower wire head to the pullout rollers installed outside fluid tank of the wire electrical discharge machine increases. If the distance from the direction change roller to the pullout rollers is long and if the speed at which the wire electrode is fed out is equal to the speed at which the wire electrode is passed through the hole in the work, the time it takes for the wire electrode to reach the pullout rollers becomes large.

In the conventional wire electrode recovery device of a wire electrical discharge machine shown, for instance, in FIG. 6, because in feeding the wire electrode 1 the anneal rollers 13 or common rollers 14 are driven and because in annealing the wire electrode 1 in a tensed state the wire electrode 1 is held immovable by the anneal rollers 13 while the common rollers 14 are driven, it is necessary to control the driving of the anneal rollers 13 and the common rollers 14 independently. For example, as shown in FIG. 5, to drive the common rollers 14 requires rotatably supporting the common rollers 14 on arms 43 through bearings 51, mounting the common rollers 14 to drive shafts 52, and transferring the torque of a motor 57 through gears 53, 54, 55, 56 to the drive shafts 52 and to the common rollers 14. Hence, not only does the construction of the lower part of the head 10 in which the common rollers 14 are installed become complicated but the operation of the common rollers 14 must include the control of the driving of the common rollers 14.

Further, to move the holder 20 fixedly attached with the feed pipe 5 vertically up or down, the guide rods 24 are formed with the feed screw 35 and the gears in the holder 20 in mesh with the feed screw 35 are driven by a motor. Although this construction allows the vertical motion of the holder 20 with high precision, its speed is limited, which has prevented the automatic feeding device for the wire electrode 1 from being improved in the feeding speed. The passage through the pullout rollers 12 of the wire electrode 1 in the automatic feeding operation is checked by detecting the difference in speed between the anneal rollers 13 and the pullout rollers 12. Detecting the speed difference precisely, however, is difficult. Although increasing the speed difference for more accurate detection allows detection of automatic feeding with increased precision, it causes break, slackening or deflection of the wire electrode 1.

SUMMARY OF THE INVENTION

To perform the automatic feeding reliably and swiftly when inserting the wire electrode into a start hole and machining holes in the work, a wire electrical discharge machine of this invention reciprocates a holder attached with a feed pipe at high speed by a cylinder device, thereby eliminating the conventional wire electrode feeding using the common rollers. Hence, in the wire electrode annealing process, the anneal rollers are driven in a reverse direction to tense the wire electrode. In the wire electrode feeding process, when the wire electrode rides on a Jet stream in a wire electrode recovery device, the wire electrode is fed at high speed to shorten the time required for feeding. In this way, the automatic feeding of the wire electrode can be performed at high speed.

In a wire electrical discharge machine which has an automatic wire feeder that feeds a wire electrode paid out from a wire electrode supply source to a machining area of the work through rollers provided above the head, with the work set between an upper wire head vertically movable with respect to the head and a lower wire head arranged opposite the upper wire head; the wire electrical discharge machine comprises: a cylinder device extending from the top of the head to its bottom and having a cylinder secured to the head and a piston reciprocatingly moving in the cylinder; a holder secured to a slider moving vertically along the cylinder in response to the motion of the piston of the cylinder device; a feed pipe through which the wire electrode is passed and which is secured to the holder so that it extends vertically down, the feed pipe being adapted to insert the wire electrode supplied from the wire electrode supply source through the upper wire head, the holes formed in the work and the lower wire head; a pair of anneal rollers provided to the holder which are driven to clamp and feed the wire electrode and through which an electric current can be passed to anneal the wire electrode; a cutter installed below the head to cut the wire electrode; a pair of clamping members that can be opened and closed to clamp the wire electrode for annealing; a waste wire clamp to remove the cut wire electrode that was cub by the cutter; a wire electrode recovery device to pull out and recover the worn wire electrode discharged from the lower wire head; and a controller to control the vertical movement of the holder, the feeding of the wire electrode by the anneal rollers, and the annealing of the wire electrode by clamping the wire electrode with the clamping members, driving the anneal rollers in the reverse direction to tense the wire electrode and, in this tensed state, annealing a portion of the wire electrode between the anneal rollers and the clamping members.

The wire electrode recovery device comprises: a direction change roller disposed downstream of the lower wire head; a jet stream guide pipe connected to the direction change roller and forming a jet stream in the direction of the wire electrode feed; and pullout rollers disposed at the outlet of the jet stream guide pipe.

The controller controls the operations of: cutting the annealed wire electrode by the cutter; removing the cut wire electrode by the waste wire clamp; activating the cylinder device to lower the feed pipe together with the wire electrode close to the upper wire head; driving the anneal rollers at low speed to feed the wire electrode at low speed to insert it through the upper wire head, the holes in the work and the lower wire head; and, when the front end of the wire electrode is inserted into the jet stream guide pipe of the wire electrode recovery device and the wire electrode rides on the let stream, driving the anneal rollers at high speed to feed the wire electrode at high speed and clamping the wire electrode with the pullout rollers.

The controller calculates a low-speed feeding time at which the wire electrode is fed by the anneal rollers based on a distance traveled by the wire electrode from the cutter to the jet stream guide pipe and on a velocity of the wire electrode, calculates a high-speed feeding time for the wire electrode based on a distance traveled by the wire electrode in the jet stream guide pipe and a wire electrode velocity, and controls the feeding speed of the wire electrode according to the calculated low-speed and high-speed feeding times.

The cylinder device has a lock device to lock the holder at the upper end of a travel range of the holder. Further, the controller controls the locking by the lock device of the holder by activating the lock device in response to a signal of a sensor that detects the upper end of the travel range of the holder, and unlocks the lock device in response to a signal requesting the feed pipe to be lowered.

The upper wire head is moved up or down with respect to the head and set at a position according to the thickness of the work. The controller controls the stopping of the holder at the upper end of the travel range in response to a detection signal of a limit switch provided at the upper end of the cylinder device and controls the stopping of the holder at the lower end of the travel range in response to a detection signal of a limit switch provided to a support rod supporting the upper wire head.

The controller performs control to clamp the wire electrode with the pullout rollers after the annealed portion of the wire electrode has passed the pullout rollers, and then pull out the wire electrode.

The controller performs control to detect a bad feeding condition for the wire electrode based on the deflection of the wire electrode between the upper wire head and the lower wire head and, according to the detected deflection of the wire electrode, restart the operation of inserting the wire electrode into the holes in the work.

In this wire electrical discharge machine, because in the wire electrode annealing process, the lower part of the wire electrode is clamped by the clamping members and the anneal rollers are reversely driven to tense the wire electrode, the wire electrode is prevented from being marked with impressions due to clamping by the anneal rollers. After having been annealed, the wire electrode is cut by the cutter at an intermediate annealed portion. This arrangement makes smooth and easy the insertion of the wire electrode into the upper wire head and the holes in the work, allowing the automatic insertion of wire electrode to be performed reliably and swiftly.

In the wire electrode annealing process, in particular, because the clamping members installed at the lower part of the head need only have a pivoting mechanism for clamping the wire electrode and can eliminate the construction for rotary drive found in the conventional common rollers, the structure of the lower part of the head can therefore be simplified, substantially reducing the number of parts.

The wire electrical discharge machine performs operations in the following sequence. In the process of automatically inserting the wire electrode by driving the anneal rollers, the wire electrode is fed at low speed until the front end of the wire electrode passes the direction change roller in the wire electrode recovery device installed downstream of the lower wire head, is guided into the let stream guide pipe and rides on the jet stream. Next, after the wire electrode rides on the jet stream, the driving speed of the anneal rollers is increased to feed the wire electrode at high speed until the wire electrode passes through the relatively long jet stream guide pipe or until the annealed wire electrode passes the pullout rollers in the wire electrode recovery device, thereby quickly passing the wire electrode through the jet stream guide pipe. This is followed by closing the parted pullout rollers to clamp the wire electrode, stopping the anneal rollers and driving the pullout rollers to transport the wire electrode. This procedure enables the automatic feeding of the wire electrode to be performed in a short time while at the same time allowing the wire electrode to be passed through the upper wire head and the lower wire head reliably and precisely.

Further, after the wire electrode is fed, the pair of parted pullout rollers are brought close together to clamp the wire electrode and are driven, with their rotation speed gradually increased from zero up to a specified speed, to wind the wire electrode. This prevents the wire electrode from being broken while being wound by the pullout rollers, and permits accurate detection of the feeding condition of the wire electrode. Further, because the clamping of the wire electrode by the pullout rollers is done after the annealed wire electrode whose strength has reduced by annealing has passed the pullout rollers, a break of the wire electrode can be prevented. With this arrangement, it is also possible to minimize breaks of fine wires, for instance, 0.1 mm or less in diameter and to reliably check the feeding condition. If the feeding condition of the wire electrode is detected from the deflection of the wire electrode between the upper wire head and the lower wire head, it is possible to immediately retry the feeding operation upon detecting a bad feeding condition, resulting in a significant reduction in the time taken by the automatic wire electrode feeding.

In this wire electrical discharge machine, because the controller can easily calculate and set the time taken by the low-speed wire electrode feeding and the one taken by the high-speed feeding from the known feeding distances and speeds, an efficient feeding control can be realized.

In this wire electrical discharge machine, because the cylinder device is used to vertically move the wire electrode feed pipe and the holder for the feed pipe at high speed in a predetermined travel range not only when the feed pipe fixed to the holder is lowered but also when it is raised, the time required for feeding can be reduced substantially compared with that when the conventional feed screw is used, thus permitting high-speed feeding with a simple drive control. Further, because the cylinder device has a stopper mechanism for locking the holder at the upper end of the travel range, it is possible to prevent the feed pipe and holder from falling during machining and causing serious troubles.

As described above, in the annealing process that is carried out when a wire electrode is fed to the machining area of the work, the wire electrical discharge machine tenses the wire electrode by clamping the wire electrode with the clamping member and driving the anneal rollers in the reverse feeding direction, and cuts the annealed wire electrode at an intermediate portion between the anneal rollers and the clamping members. Because of this procedure, the champed portion of the wire electrode where the anneal rollers were reversely driven is marked with a smaller impression than the portion clamped by the clamping members. This in turn permits reliable and swift automatic insertion of the annealed wire electrode into the upper wire head, holes in the work and the lower wire head. Because the clamping members only clamp the wire electrode and do not perform the rotary driving for feeding, the clamping structure and control can be made simpler. Further, because the wire electrode is fed at low speed for a predetermined time in the first half of the automatic feeding during which the wire electrode is inserted through the upper wire head, holes in the work and the lower wire head and because, after the low-speed feeding, the wire electrode is fed at high speed for a predetermined time to the pullout rollers, which in turn transport and recover the wire electrode, the total amount of time required for wire electrode feeding and insertion can be reduced significantly.

DETAILED DESCRIPTION OF THE PREFERRED EMBODIMENTS

Figure 6:
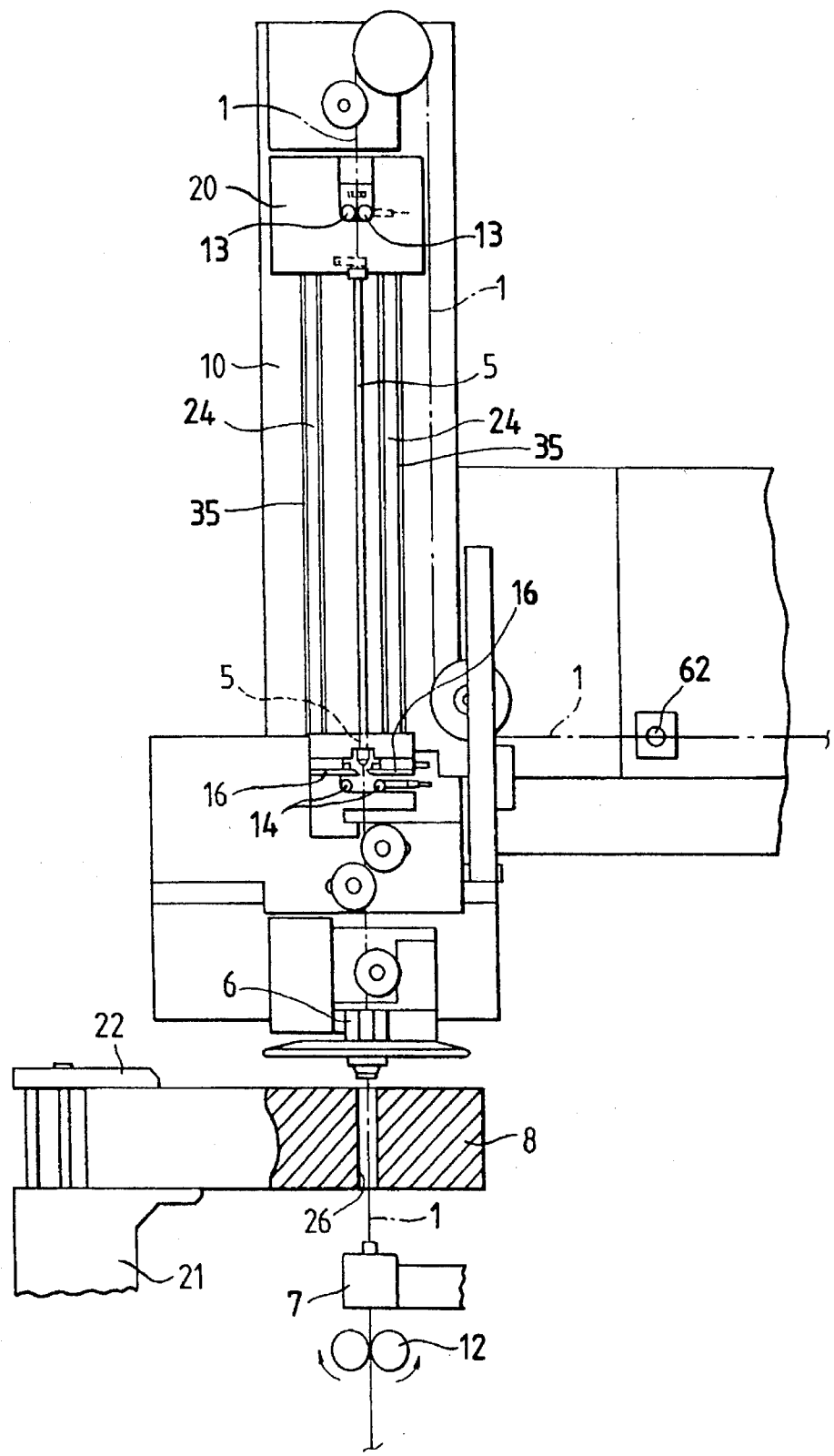
FIG. 6 is an outline front view showing the conventional wire electrical discharge machine.

Now, by referring to the accompanying drawings, one embodiment of the wire electrical discharge machine of this invention will be described. In the drawings, components identical with those of the wire electrical discharge machine of FIG. 6 are given like reference numbers.

This wire electrical discharge machine has a support 9 at the top of a head 10 which contains a direction change roller 15 and a felt brake roller 11. In the lower part of the head 10 a direction change roller 2 is installed. A wire electrode feeder supplies a wire electrode 1 from a source bobbin (not shown) through these rollers to the machining locations in a work 8. In the lower part of the head 10 there are a cutter 16 for cutting the wire electrode 1, a pair of clamping members 27 for clamping or releasing the wire electrode 1, a waste wire clamp 19 for removing the wire electrode 1 cut by the cutter 16, and guide rollers 18 for guiding the wire electrode 1.

The head 10 is provided with a Z-axis unit 37, which has a support rod 60 vertically movable with respect to the head 10 and a support body 23 secured to the lower end of the support rod 60. The support body 23 is mounted with a guide roller 38 and an upper wire head 6. Opposing the upper wile head 6 is a lower wire head 7 that is mounted on the base of the head 10 through a lower arm. The work 8 to be by electric-discharge machined by the wire electrode 1 is set at a specified position between the upper wire head 6 and the lower wire head 7 and fixed to a support base 21 by a clamp 22. The worn wire electrode 1 coming out of the lower wire head 7 is pulled and recovered by a wire electrode recovery device 30.

Figure 1:
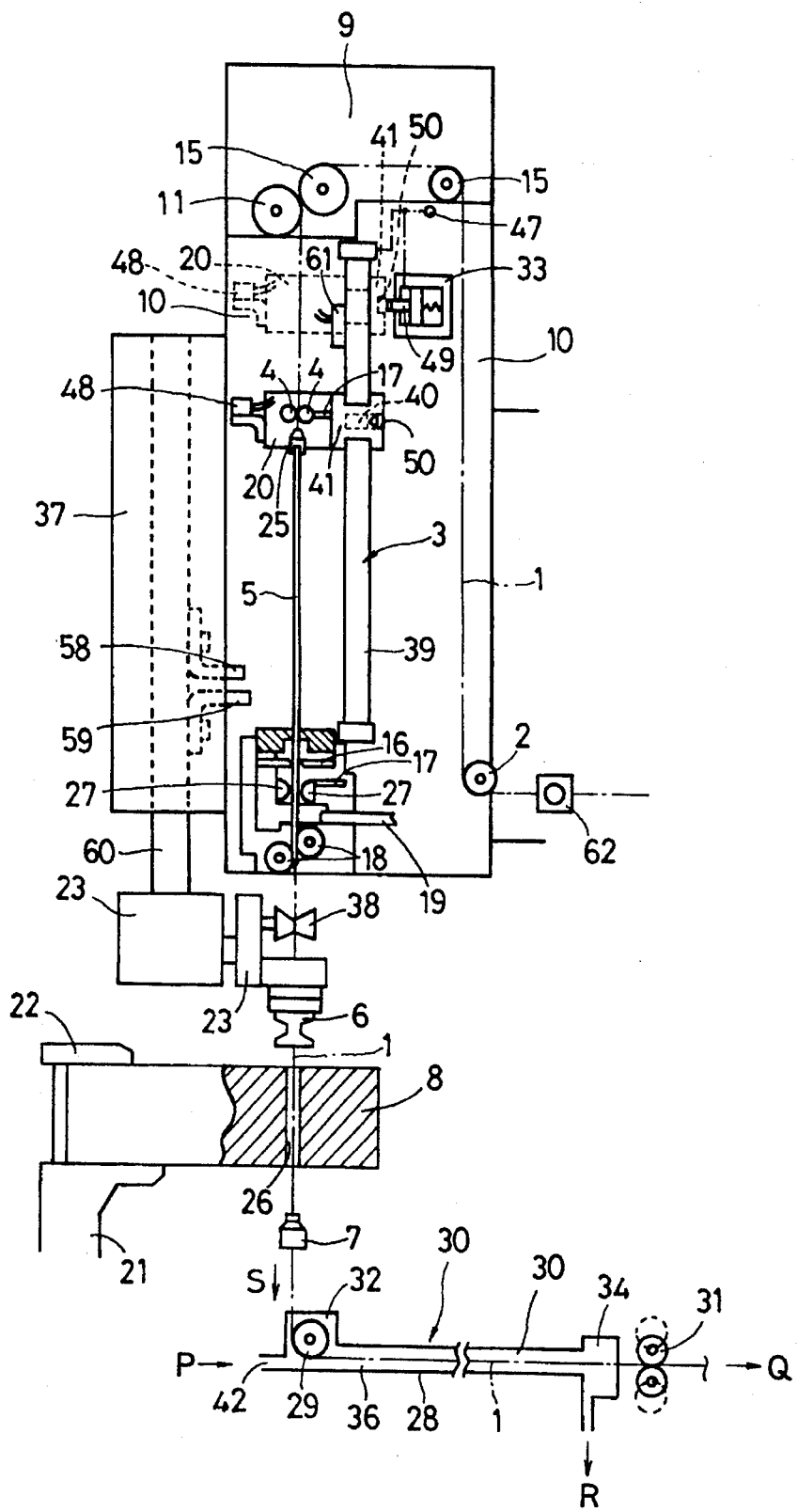
FIG. 1 is an outline front view showing one embodiment of the wire electrical discharge machine of this invention.

In FIG. 1, a holder 20 is shown to be positioned between the upper and lower limit of its travel range. With the holder 20 at the upper limit position indicated by a dashed line, the lower end of the feed pipe 5 is set immediately above the cutter 16. In this state, the wire electrode 1 is annealed. With the holder 20 at the lower limit position, the lower end of the feed pipe 5 is set immediately above the upper wire head 6. In this condition the wire electrode 1 is passed through the upper wire head 6, a hole 26 of the work 8 and the lower wire head 7.

The wire electrical discharge machine has a cylinder device 3 secured to the head 10 that extends between the upper part of the head 10 and the lower part where the cutter 16 is installed. The cylinder device 3 has a double-acting cylinder structure which has a cylinder 39 secured to the head 10 and a piston 40 that reciprocates inside the cylinder 39. The piston 40 is made, for instance, of a permanent magnet and is reciprocates inside the cylinder 39 when air is supplied into the cylinder chambers on either side. The range of vertical motion of the piston 40 is set by adding an allowable value that considers braking errors such as inertia that are obtained from two or more experimental operations of the cylinder device 3. A controller is controlled to make the air pump supply a set amount of air to the cylinder device 3 so that the piston 40 moves a set distance.

On the outer surface of the cylinder 39 is mounted a slider 41 that reciprocates, attracted by the piston 40. The slider 41 is rigidly provided with a holder 20 that moves up or down along the head 10. The holder 20 is secured by set screws 25 with a feed pipe 5 extending vertically downward. The feed pipe 5 having the wire electrode 1 running therethrough is lowered to insert the wire electrode 1, which was supplied from the wire electrode supply device, into the upper wire head 6, a hole 26 in the work 8 such as a start hole and a machining slit, and the lower wire head 7. The holder 20 has a pair of anneal rollers 4 that are driven to feed the wire electrode 1 and can be supplied electricity through a feed element 17 for annealing the wire electrode 1.

Figure 3:
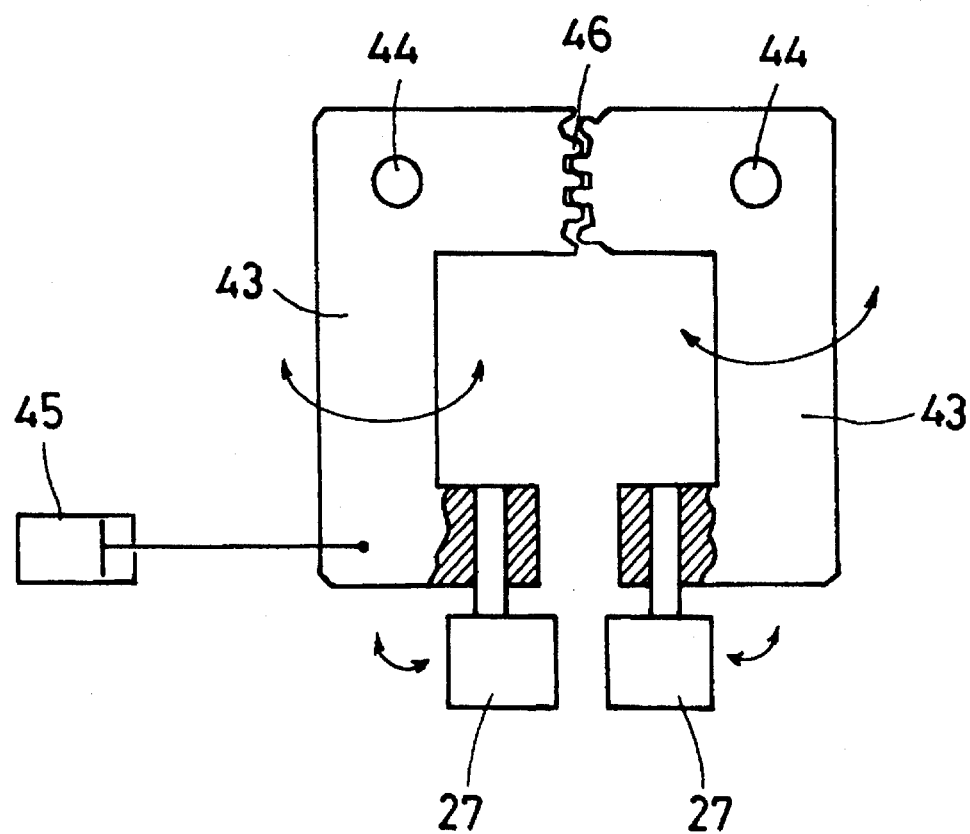
FIG. 3 is a schematic view showing one embodiment of the clamping member used in the wire electrical discharge machine of FIG. 1.
Figure 4:
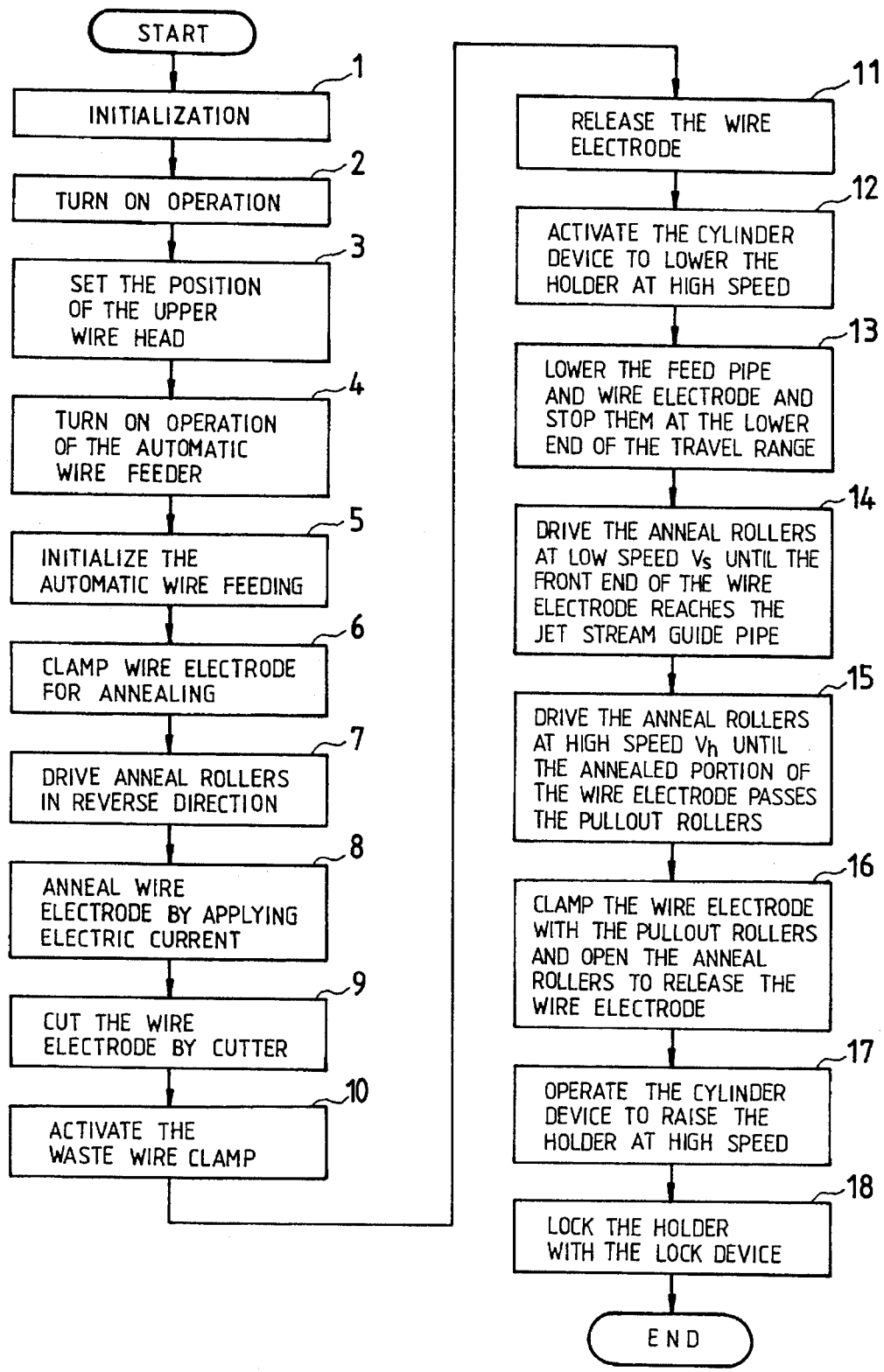
FIG. 4 is a processing flow diagram showing one example sequence of actions performed by the wire electrical discharge machine of FIG. 1.
Figure 5:
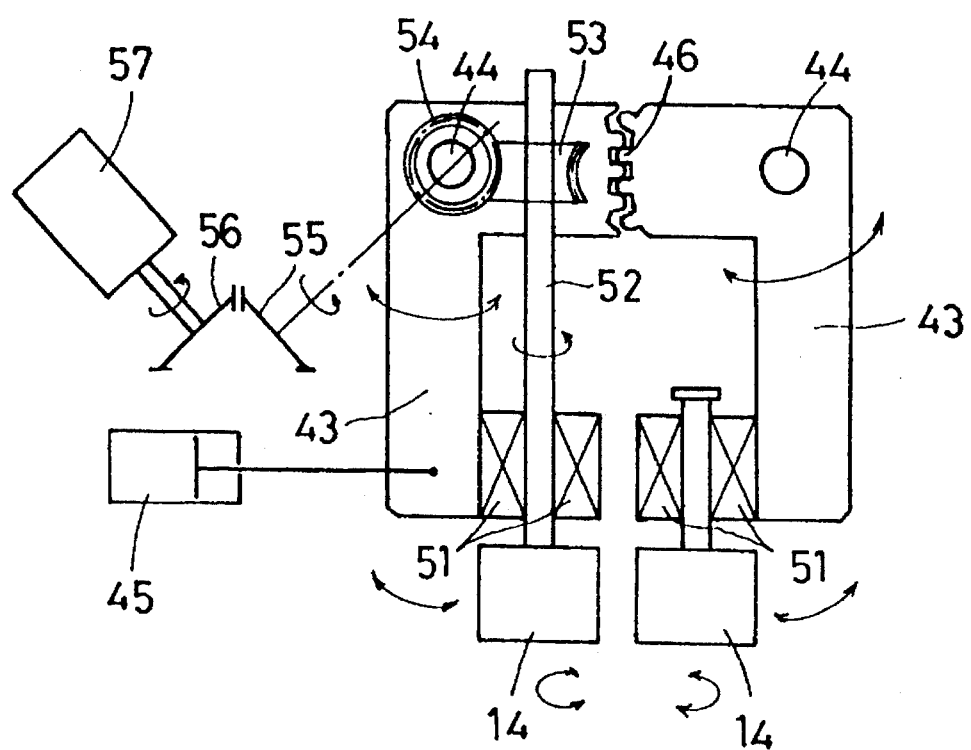
FIG. 5 is a schematic view showing common rollers used in a conventional wire electrical discharge machine.

By the controller (not shown) the wire electrical discharge machine controls the vertical movement of the holder 20, the feeding of the wire electrode 1 by the anneal rollers 4, and the annealing operation in which the wire electrode 1 between the anneal rollers 4 and the clamping members 27 is annealed, with the clamping members 27 holding the wire electrode 1 immovable and with the anneal rollers 4 reversely driven to tense the wire electrode 1. The clamping members 27, as shown in FIG. 3, are fixed to arms 43 that are arranged opposite each other with their teeth 46 engaged. The arms 43 can be pivoted about a fulcrum 44 by actuating a cylinder 45 so that the clamping members 27, when the arms 43 are closed by the cylinder 45, hold the wire electrode 1 immovable.

The wire electrode recovery device 30 includes a direction change roller 29 installed downstream of the lower wire head 7, a Jet stream guide pipe 28 disposed downstream of the direction change roller 29, and pullout rollers 31 arranged at the outlet of the jet stream guide pipe 28. The jet stream guide pipe 28 is supplied a jet stream of water from a fluid pump through an inlet 42 to carry forward the wire electrode 1 fed from the direction change roller 29. The wire electrode recovery device 30 comprises a direction change roller 29, a direction change unit 32 to carry the wire electrode 1, which was introduced in the S direction, by the water stream injected in the P direction toward an outlet 36 downstream, a jet stream guide pipe 28, and a water separation unit 34 connected to the jet stream guide pipe 28 to separate only water and discharge it in the R direction and at the same time feeds the wire electrode 1 in the Q direction toward the pullout rollers 31 downstream. The water supplied under pressure into the direction change unit 32 may be liquid other than water or gases.

The controller, upon receiving a signal indicating the passage through the pullout rollers 31 of the annealed portion of the wire electrode 1, controls the pullout rollers 31 to clamp the wire electrode 1 and pull it out. The controller detects the feeding condition of the wire electrode 1 from the deflection of that portion of the wire electrode 1 between the upper wire head 6 and the lower wire head 7 and, in response to a signal representing the bad feeding condition of the wire electrode 1, starts the operation for inserting the wire electrode 1 into the work 8. The deflection of the wire electrode 1 can be detected by incorporating a shorting ring, that can be shorted by the deflection of the wire electrode 1, between the upper wire head 6 and the lower wire head 7.

The controller, in particular, is made to perform the following controls. The control procedure includes: cutting the annealed wire electrode 1 by the cutter 16; removing the cut wire electrode 1 by the waste wire clamp 19; driving the anneal rollers 4 at low speed to feed the wire electrode 1 and pass it through the upper wire head 6, the hole 26 in the work 8 and the lower wire head 7 until the front end of the wire electrode 1 is inserted into the jet stream guide pipe 28 of the wire electrode recovery device 30; and, when the wire electrode 1 rides on the jet stream, driving the anneal rollers 4 at high speed to feed the wire electrode 1 at high speed and allow it to be clamped by the pullout rollers 31. The controller also calculates the low-speed feed time taken by the anneal rollers 4 to feed the wire electrode 1 from the cutter 16 to the jet stream Guide pipe 28 based on the wire travel distance and the wire electrode speed. Further, the controller calculates the high-speed feed time it takes for the wire electrode 1 to be fed from the direction change roller 29 to the pullout rollers 31 based on the wire travel distance and the wire electrode speed. According to these calculated results, the controller can change the feed speed for the wire electrode 1.

The cylinder device 3 has a lock device 33 to lock the holder 20 at the upper end of the travel range of the holder 20. The controller, in response to the sensor detecting the upper end of the travel range of the holder 20, activates the lock device 33 to lock the holder 20 and, in response to the feed pipe lower signal, resets the lock device 33. The holder 20 is arranged outside the cylinder 39 of the cylinder device 3 and is fixed to the slider 41 that moves together with the piston 40. The upper wire head 6 is moved up or down with respect to the head 10 and its position is set according to the thickness of the work 8. The holder 20 has a lower end detection switch 48 and the slider 41 secured to the holder 20 is formed with an engagement hole 50.

The controller stops the holder 20 at the upper and lower ends of the travel range in the following manner. The stopping of the holder 20 at the lower end of the travel range is effected when the lower end detection switch 48 provided in the holder 20 moves up or down relative to the head 10 and comes into contact with a limit switch provided to the support rod 60 and located at the predetermined position, i.e., a lower end dog 58. The stopping at the upper end of the travel range is effected when the holder 20 or the slider 41 contacts a limit switch provided at the upper end of the cylinder 39 of the cylinder device 3, i.e., an upper end detection switch 61. The lock structure at the lower end of the holder 20 is received and locked by a lower end stopper 59 provided to the support rod 60. The lock device 33 works as follows. When air supply from an air supply passage 47 is interrupted in response to the controller signal, an engagement pin 49 is forced to project by the spring force and engages in the engagement hole 50 formed in the slider 41 of the holder 20, locking the holder 20 at the upper limit position from falling. The resetting of the lock device 33 is done as follows. When the air from the air supply passage 47 is supplied to the lock device 33 in response to the controller signal, the air pressure retracts the engagement pin 49 out of the engagement hole 50 against the spring force, thus unlocking the holder 20.

Next, an example operation of the wire electrical discharge machine is explained. Operations identical with those of the conventional wire electrical discharge machine are omitted.

This wire electrical discharge machine first initializes the discharge machining procedure (step 1), turns on the operation of the wire electrical discharge machine (step 2), moves the upper wire head 6 above the hole 26 such as a start hole and sets its position (step 3), and then turns on the automatic wire electrode feeder (step 4). After being turned on, the automatic wire electrode feeder for the wire electrode 1 initializes the automatic feeding procedure by opening apart the paired rollers such as anneal rollers 4, clamping members 27 and pullout rollers 31 (step 5).

Next, the automatic wire feeder feeds the wire electrode 1 from the source bobbin through various rollers such as tension rollers and direction change roller and through the direction change rollers 2, 15, felt brake roller 11 and anneal rollers 4 to the feed pipe 5 until the front end of the wire electrode 1 is exposed projecting from the lower end of the feed pipe 5. As part of the initialization of the wire electrical discharge machine, the front end portion of the wire electrode 1 is cut to an appropriate length by the cutter 16 and the cut wire electrode 1 is removed by the waste wire clamp 19. Now, the initialization of the wire automatic feeding procedure is complete.

Figure 2:
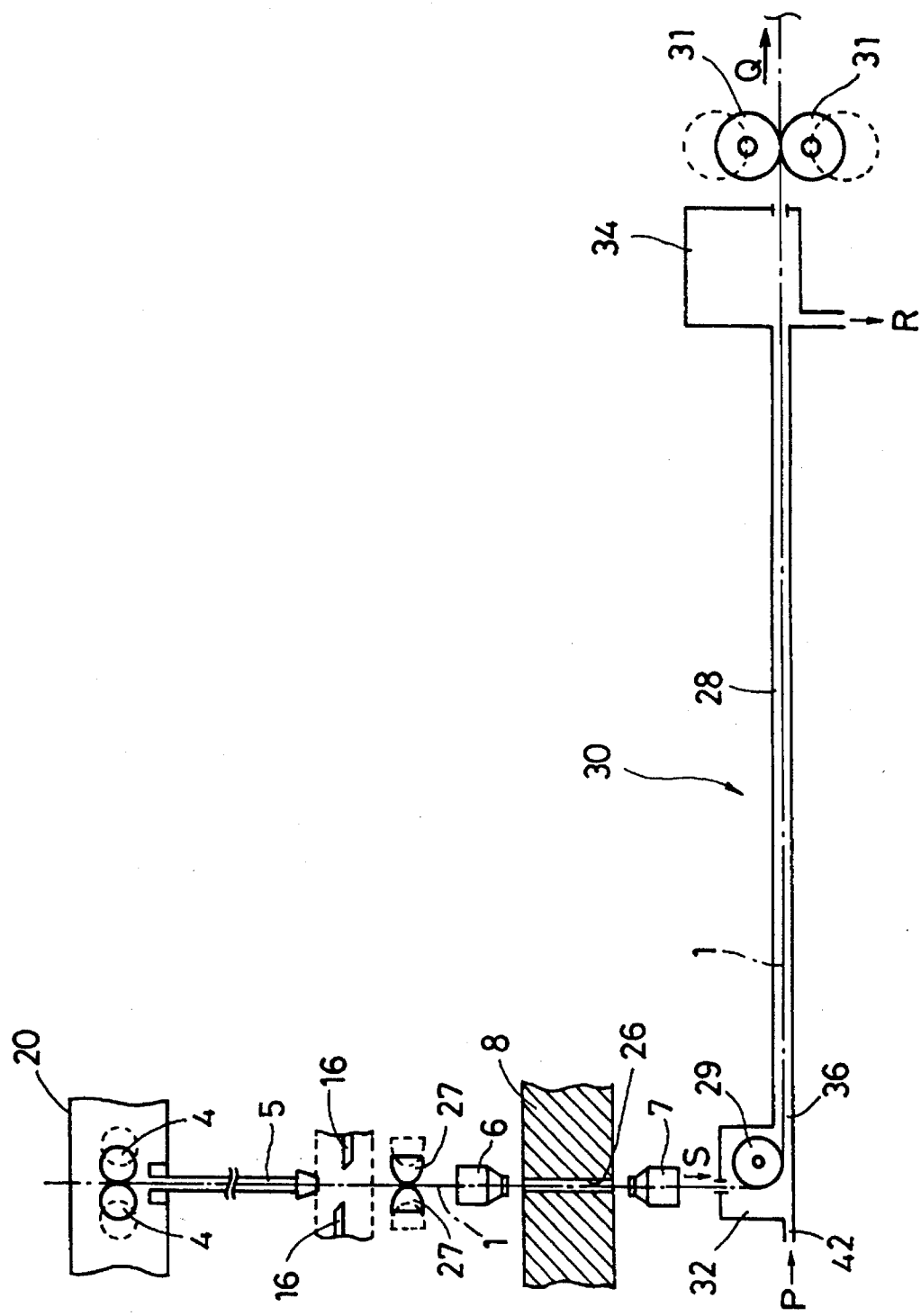
FIG. 2 is a schematic diagram showing the feeding path for the wire electrode in the wire electrical discharge machine of FIG. 1.

Then, the machine proceeds to the annealing processing for the wire electrode 1 and brings the paired anneal rollers 4 and the paired clamping members 27, respectively, closer together at positions indicated by solid line (FIG. 2) to clamp the wire electrode 1 (step 6). With the wire electrode 1 clamped by the anneal rollers 4 and the clamping members 27, the anneal rollers 4 are driven in the reverse direction (upwardly) to tense the wire electrode 1 between the anneal rollers 4 and the clamping members 27 (step 7). A voltage is applied between the feed element 17 pressed against the anneal rollers 4 and the feed element 17 pressed against the clamping members 27 to pass an electric current through the wire electrode 1 to anneal the wire electrode 1 through the Joule heat produced by the current, thereby removing internal stress in the wire so that the wire electrode 1 extends straight downward (step 8). With the annealing of the wire electrode 1 completed, the front end portion of the wire electrode 1 is cut by the cutter 16 situated upstream of the clamping members 27 and below the lower end of the feed pipe 5 (step 9). The cut wire electrode 1 is discharged sideways by the waste wire clamp 19 (step 10).

Next, the anneal rollers 4 and the clamping members 27 are opened to release the wire electrode 1 to let the annealed wire electrode 1 droop freely (step 11). The wire electrode 1 is again clamped by the anneal rollers 4 with slightly larger clamping force than used during the annealing and the cylinder device 3 is activated to quickly lower the holder 20 and the wire electrode 1 so that the front end of the feed pipe 5 is located above the upper wire head 6 (step 12). The high-speed lowering of the holder 20 is done as follows. When air is supplied to the cylinder device 3 to lower the piston 40, the slider 41 sucked to the piston 40 is also lowered along the cylinder 39, causing the holder 20 secured to the slider 41 to move down. The cylinder device 3 is driven at high speed by being supplied a predetermined amount of air from the air pump to lower the holder 20 and the wire electrode 1 at a speed higher than the lowering speed of the conventional feed screw system, thus significantly reducing the lowering time. When the holder 20 together with the anneal rollers 4 is driven downward by the operation of the cylinder device 3 and the front end of the feed pipe 5 comes close to the upper wire head 6, the cylinder device 3 is deactivated to stop the lowering motion of the holder 20 (step 13).

Next, the anneal rollers 4 are driven at low speed in the forward direction (downwardly) for a predetermined time Ts to lower the wire electrode 1 (step 14). This low-speed feeding causes the wire electrode to pass through the feed pipe 5 into the upper wire head 6, the hole 26 in the work 8 and the lower wire head 7 until the front end of the wire electrode 1 comes below the direction change roller 29 of the wire electrode recovery device 30.

The predetermined time Ts taken by the low-speed feeding of the wire electrode 1 can be calculated by dividing by the slow-speed wire feeding velocity Vs a total distance, which is the summation of a predetermined distance from the cutter 16 to the upper surface of the work 8, a distance from the lower surface of the work 8 to the lower end of the direction change roller 29, a distance equivalent to the diameter of the direction change roller 29, a distance equivalent to the thickness of the work 8, and a length of the first half of the jet stream guide pipe 28, i.e., the distance from the cutter 16 to where the wire electrode 1 rides on the water stream.

The direction change roller 29 in the direction change unit 32 has a function of changing the direction of the wire electrode 1 from downward to sideways by cooperating with the jet stream supplied into the jet stream guide pipe 28 from the inlet 42 of the direction change unit 32. That is, the direction change unit 32 guides the wire electrode 1 fed from above along the direction change roller 29 by the water stream supplied from the inlet 42 at the side of the direction change unit 32 so that the wire electrode 1 rides on the stream. Then, the anneal rollers 4 are driven forwardly at high speed for a precalculated, set time Th to transport the wire electrode 1 from under the direction change roller 29 through the jet stream guide pipe 28 and the water separation unit 34 to the open pullout rollers 31 (step 15). The set time Th for high-speed feeding can be determined by dividing by the high-speed wire feeding velocity Vh (Vh>Vs) at the anneal rollers 4 the total distance, which is the sum of the distance from the rear end of the direction change roller 29 to the rear end of the pullout rollers 31 and the length of the annealed portion of the wire electrode 1. With the water separated in the water separation unit 34 and released in the direction of arrow, the wire electrode 1 is pulled out of the water separation unit 34 and then passed between the open pullout rollers 31.

As described above, to reliably accomplish the process of inserting the wire electrode 1 into the upper wire head 6, the hole 26 in the work 8, the lower wire head 7 and the direction change unit 32, the wire electrical discharge machine supplies the wire electrode 1 at low velocity Vs. The wire electrode 1 is then passed through the direction change unit 32, the relatively long jet stream guide pipe 28 and the pullout rollers 31. To pass the wire electrode i through the jet stream guide pipe 28 in a short time, it is supplied at high-speed feeding velocity Vh.

Next, the pullout rollers 31 are driven in the closing direction to clamp the wire electrode 1. Because the annealed portion of the wire electrode 1 has a reduced strength, the wire electrode i is clamped and pulled out by the pullout rollers 31 only after the annealed portion of the wire electrode 1 has passed the pullout rollers 31. Then the anneal rollers 4 are separated to the positions indicated by the dashed line to release the wire electrode 1, at which time the wire electrode feeding by the anneal rollers 4 is stopped. Then the machine proceeds to the process of pulling out and recover the wire electrode 1. Whether or not the wire electrode 1 is being pulled out by the pullout rollers 31 in good condition can be detected by the controller equipped with an encoder (step 16).

When the wire electrode feed operation is detected to be in good condition by the controller, the controller activates the cylinder device 3 to move the holder 20 together with the anneal rollers 4 and feed pipe 5 upward at high speed until the holder 20 reaches the upper end of the travel (step 17). Then, the controller activates the lock device 33 to lock the holder 20 at the top of-the head 10 (step 18). Then, the wire electrical discharge machine proceeds to the electric discharge machining of the work 8 using the wire electrode 1, as in the conventional machine, to apply a voltage between the wire electrode 1 and the work 8 to machine the work 8 according to the ordinary electric discharge machining process. In the process of step 16, if the wire electrode recovery by the pullout rollers 31 should be found to be not in good condition by the controller, the automatic wire feeding operation needs to be performed again.

What is claimed is:

1. A wire electrical discharge machine comprising:

an upper wire head mounted to a head so that it is vertically movable;

a lower wire head installed below a work arranged below the upper wire head;

an automatic wire feeder to feed a wire electrode paid out from a wire electrode supply source through rollers disposed above the head to a machining area of the work;

a cylinder device extending from the top of the head to its bottom and having a cylinder secured to the head and a piston reciprocatingly moving in the cylinder;

a holder secured to a slider moving vertically along the cylinder in response to the motion of the piston of the cylinder device;

a feed pipe through which the wire electrode is passed and which is secured to the holder so that it extends vertically down, the feed pipe being adapted to insert the wire electrode supplied from the wire electrode supply source through the upper wire head, the holes formed in the work and the lower wire head;

a pair of anneal rollers provided to the holder which are driven to clamp and feed the wire electrode and through which an electric current can be passed to anneal the wire electrode;

a cutter installed on the head to cut the wire electrode;

a pair of clamping members provided to the head at a location below the cutter, the clamping members being adapted to be opened and closed to clamp the wire electrode for annealing;

a waste wire clamp to remove the cut wire electrode that was cut by the cutter;

a wire electrode recovery device to pull out and recover the worn wire electrode discharged from the lower wire head; and a controller to control the vertical movement of the holder, the feeding of the wire electrode by the anneal rollers, and the annealing of the wire electrode by clamping the wire electrode with the clamping members, driving the anneal rollers in the reverse direction to tense the wire electrode and, in this tensed state, annealing a portion of the wire electrode between the anneal rollers and the clamping members.

2. A wire electrical discharge machine according to claim 1, wherein the wire electrode recovery device comprises:

a direction change roller disposed downstream of the lower wire head;

a jet stream guide pipe connected to the direction change roller and forming a jet stream in the direction of the wire electrode feed; and pullout rollers disposed at the outlet of the jet stream guide pipe.

3. A wire electrical discharge machine according to claim 2, wherein the controller controls the operations of: cutting the annealed wire electrode by the cutter; removing the cut wire electrode by the waste wire clamp; activating the cylinder device to lower the feed pipe together with the wire electrode close to the upper wire head; driving the anneal rollers at low speed to feed the wire electrode at low speed to insert it through the upper wire head, the holes in the work and the lower wire head; and, when the front end of the wire electrode is inserted into the jet stream guide pipe of the wire electrode recovery device and the wire electrode rides on the jet stream, driving the anneal rollers at high speed to feed the wire electrode at high speed and clamping the wire electrode with the pullout rollers.

4. A wire electrical discharge machine according to claim 3, wherein the controller calculates a low-speed feeding time at which the wire electrode is fed by the anneal rollers based on a distance traveled by the wire electrode from the cutter to the jet stream guide pipe and on a velocity of the wire electrode, calculates a high-speed feeding time for the wire electrode based on a distance traveled by the wire electrode in the jet stream guide pipe and a wire electrode velocity, and controls the feeding speed of the wire electrode according to the calculated low-speed and high-speed feeding times.

5. A wire electrical discharge machine according to claim 1, wherein the cylinder device has a lock device to lock the holder at the upper end of a travel range of the holder.

6. A wire electrical discharge machine according to claim 5, wherein the controller controls the locking by the lock device of the holder by activating the lock device in response to a signal of a sensor that detects the upper end of the travel range of the holder, and unlocks the lock device in response to a signal requesting the feed pipe to be lowered.

7. A wire electrical discharge machine according to claim 1, wherein the upper wire head is moved up or down with respect to the head and set at a position according to the thickness of the work.

8. A wire electrical discharge machine according to claim 1, wherein the controller controls the stopping of the holder at the upper end of the travel range in response to a detection signal of a limit switch provided at the upper end of the cylinder device and controls the stopping of the holder at the lower end of the travel range in response to a detection signal of a limit switch provided to a support rod supporting the upper wire head.

9. A wire electrical discharge machine according to claim 1, wherein the controller performs control to clamp the wire electrode with the pullout rollers after the annealed portion of the wire electrode has passed the pullout rollers, and then pull out the wire electrode.

10. A wire electrical discharge machine according to claim 1, wherein the controller performs control to detect a bad feeding condition for the wire electrode based on the deflection of the wire electrode between the upper wire head and the lower wire head and, according to the detected deflection of the wire electrode, restart the operation of inserting the wire electrode into the holes in the work.

* * * * *